United States Patent
Erhart et al.

(10) Patent No.: US 8,364,125 B2
(45) Date of Patent: Jan. 29, 2013

(54) CONTENT DELIVERY TO A TELECOMMUNICATIONS TERMINAL THAT IS ASSOCIATED WITH A CALL IN PROGRESS

(75) Inventors: George William Erhart, Pataskala, OH (US); Valentine C. Matula, Granville, OH (US); David Joseph Skiba, Golden, CO (US)

(73) Assignee: Avaya, Inc., Basking Ridge, NJ (US)

( * ) Notice: Subject to any disclaimer, the term of this patent is extended or adjusted under 35 U.S.C. 154(b) by 1746 days.

(21) Appl. No.: 10/984,398

(22) Filed: Nov. 9, 2004

(65) Prior Publication Data

US 2006/0165050 A1 Jul. 27, 2006

(51) Int. Cl.
*H04M 1/725* (2006.01)
*H04M 3/42* (2006.01)
*H04W 24/00* (2009.01)

(52) U.S. Cl. ............... 455/412.2; 455/417; 455/456.1
(58) Field of Classification Search ............... 455/456.1, 455/456.2, 456.3, 456.4, 456.5, 456.6, 457, 455/414.3, 412.1, 412.2, 417; 709/219, 206, 709/218
See application file for complete search history.

(56) References Cited

U.S. PATENT DOCUMENTS

| | | | | |
|---|---|---|---|---|
| 5,001,710 A * | 3/1991 | Gawrys et al. | ................. | 370/271 |
| 5,581,611 A * | 12/1996 | Yunoki | ................... | 379/211.03 |
| 5,619,557 A * | 4/1997 | Van Berkum | ............ | 379/265.02 |
| 5,805,682 A * | 9/1998 | Voit et al. | ................... | 379/142.16 |
| 5,861,881 A * | 1/1999 | Freeman et al. | ............... | 715/201 |
| 6,084,628 A | 7/2000 | Sawyer | | |
| 6,351,279 B1 | 2/2002 | Sawyer | | |
| 6,493,431 B1 * | 12/2002 | Troen-Krasnow et al. | | 379/88.12 |
| 6,545,589 B1 * | 4/2003 | Fuller et al. | ................... | 340/7.22 |
| 6,608,556 B2 * | 8/2003 | De Moerloose et al. | ..... | 340/501 |
| 6,683,941 B2 | 1/2004 | Brown et al. | | |
| 6,731,940 B1 * | 5/2004 | Nagendran | ................ | 455/456.1 |
| 6,738,631 B1 * | 5/2004 | Adler et al. | ................ | 455/456.6 |
| 6,741,927 B2 * | 5/2004 | Jones | ............................ | 701/201 |
| 6,973,175 B2 * | 12/2005 | Huang et al. | ............. | 379/265.04 |
| 7,006,491 B2 * | 2/2006 | Saeed et al. | .................... | 370/352 |
| 7,050,565 B2 * | 5/2006 | Sylvain | ..................... | 379/265.09 |
| 7,266,591 B1 * | 9/2007 | Johnston | ........................ | 709/219 |
| 7,376,441 B2 * | 5/2008 | Lee | ............................ | 455/556.1 |
| 2002/0010000 A1 * | 1/2002 | Chern et al. | .................. | 455/517 |
| 2002/0034290 A1 * | 3/2002 | Pershan | .................... | 379/207.02 |
| 2002/0087353 A1 * | 7/2002 | Han | ................................ | 705/1 |
| 2003/0014754 A1 * | 1/2003 | Chang | ........................... | 725/60 |
| 2003/0104820 A1 * | 6/2003 | Greene et al. | ................. | 455/456 |
| 2003/0161447 A1 * | 8/2003 | Kind | ......................... | 379/88.13 |
| 2004/0120485 A1 * | 6/2004 | Basore et al. | .............. | 379/93.23 |
| 2004/0137929 A1 * | 7/2004 | Jones et al. | .................... | 455/517 |
| 2004/0177378 A1 * | 9/2004 | Cool | ................................. | 725/89 |
| 2004/0266460 A1 * | 12/2004 | Reynolds | ...................... | 455/457 |
| 2006/0031316 A1 * | 2/2006 | Forstadius | .................... | 709/206 |
| 2007/0135127 A1 * | 6/2007 | Andersson | ...................... | 455/445 |
| 2007/0157259 A1 * | 7/2007 | Koplar et al. | ................... | 725/81 |
| 2008/0016526 A1 * | 1/2008 | Asmussen | ....................... | 725/34 |

* cited by examiner

Primary Examiner — Christopher M Brandt

(57) ABSTRACT

A method is disclosed that enables the delivery of relevant content to a telecommunications user engaged in a call. In particular, in the illustrative embodiments a telecommunications terminal that is to receive content is selected based on (i) a telecommunications terminal involved in a call and (ii) the mode of communication (e.g., voice, video, text, etc.) of the call. In addition, in the illustrative embodiments the second terminal to which content is to be delivered might also be based on one or more of the following: the identity of the user; the identity of other users involved in the call; the telecommunications terminal employed by the user for the call; other telecommunications terminals involved in the call; the date and time; the location of the user; and the location of other users involved in the call.

33 Claims, 7 Drawing Sheets

CONTENT DELIVERY TO A TELECOMMUNICATIONS TERMINAL THAT IS ASSOCIATED WITH A CALL IN PROGRESS

FIELD OF THE INVENTION

The present invention relates to telecommunications in general, and, more particularly, to a technique for delivering content to a telecommunications terminal during a call.

BACKGROUND OF THE INVENTION

FIG. 1 depicts telecommunications system 100 in the prior art. Telecommunications system 100 comprises telecommunications terminals 101-1 through 101-J, wherein J is a positive integer, and switch 103, interconnected as shown.

Switch 103 enables two or more telecommunications terminals 101 to communicate with each other by connecting (e.g., electrically, optically, etc.) a telecommunications terminal to another telecommunications terminal and by passing signals between the telecommunications terminals.

Telecommunications terminals 101-$j$, for $j=1$ through J, are capable of placing calls to and receiving calls from one or more other terminals 101. In addition, each telecommunications terminal 101-$j$ is capable of communicating via one or more modes of communication (e.g., voice, video, text messaging, etc.). For example, telecommunications terminal 101-$j$ might be able to send and receive voice and video signals simultaneously.

Furthermore, for a user engaged in a call, telecommunications terminal 101-$j$ might be able to automatically receive content (e.g., video, audio, text, etc.) that is based on the call. A technique for selecting content that is based, in particular, on the dialog of the call can be found in co-pending U.S. application Ser. No. 10/950,984. When applied to a voice call, the technique in the co-pending application involves monitoring the dialog between two users (e.g., through speech recognition, etc.) and retrieving content that is based, at least in part, on the dialog. For example, if two users are talking about cars during a voice call, a General Motors promotional video might be transmitted to a user's terminal and played during the call.

SUMMARY OF THE INVENTION

In many situations, it is either impractical or impossible to deliver content to a user through the telecommunications terminal being used for the call. For example, if a user is on a voice call using a cellular telephone, the cell phone might not be equipped to handle video content. Even if the cell phone has a video display, the display might be too small or the achievable transmission data rate might be too low to handle useful video content. As another example, the room phone that a hotel guest uses to call Room Service might be incapable of receiving video content, but nearby equipment, such as the television, might be available to receive video content.

The present invention enables the delivery of relevant content to a telecommunications user who is involved in a call. In particular, in the illustrative embodiments a telecommunications terminal (referred to as the "second terminal") that is to receive content is selected based on (i) the telecommunications terminal (referred to as the "first terminal") that is involved in the call and (ii) the mode of communication (e.g., voice, video, text, etc.) of the call.

In addition, in the illustrative embodiments the second terminal might also be based on one or more of the following: the identity of the user; the identity of other users involved in the call; telecommunications terminals involved in the call other than the first terminal; the date and time; the location of the user; and the location of other users involved in the call. The following examples illustrate the utility of delivering content that is based on these factors:

If a first hotel guest in room 222 is calling to Maid Service, scripted video content of a hotel employee holding up two different-sized pillows will be streamed to the television in room 222. Furthermore, if a second hotel guest in room 987 is calling to Room Service for food, scripted video content of a hotel employee pointing out items on a dessert trolley will be streamed to the television in room 987.

A company employee using a wireless phone for a call wanders into an office with an available computer terminal. The content related to the call will be directed to the computer terminal for display purposes.

A traveler at an airport on a wireless phone walks up to an available video display. The content of the call will be directed to the display. Nervous about catching his flight, the traveler starts moving again towards his gate. Approaching a second video display that is closer to his gate, the traveler will then see the content of the call displayed on the second display.

Some who is hard of hearing wants to use an Interactive Voice Response (or "IVR") system. The person calls into the IVR system using a voice terminal (e.g., landline phone, etc.). The caller hears the IVR menu options, but not well. Meanwhile, the IVR menu options will be presented in a text mode of communication on a nearby display.

A customer seated in front of her computer terminal calls into a support center. If the support center determines that the call will probably be quick or easy to answer via a voice mode of communication, no supplementary content will be transmitted. If, however, the time remaining in the call is estimated to be long or if presenting some images (e.g., product photos, forms to fill out, etc.) would be helpful to the customer, supplementary content will be transmitted to her computer terminal.

A cell phone user calls a friend in the middle of the afternoon. Since the caller is usually in her office at that time, content related to the call will be displayed on her office computer monitor. Later, the same user calls a friend late at night. Since the caller is usually at her home at that time, content related to the call will be displayed on her home computer monitor.

In the illustrative embodiments, a data-processing system monitors a call, as well as the users and telecommunications terminals involved in the call. The data-processing system selects a mode of communication to convey call-related content to a user. For example, the mode of communication might have to be non-disruptive to the user (i.e., the user is able to perceive and comprehend the content while simultaneously engaging in conversation). The data-processing system transmits the content to the selected terminal. As a result, a user engaged in a voice call on a first terminal might receive on a second terminal video content, but possibly not audio content.

This specification describes two illustrative embodiments of the present invention. The first illustrative embodiment represents a telecommunications system in which the signals that are intended for a second telecommunications terminal bypass a first terminal while they are being transmitted. The second illustrative embodiment represents a telecommunications system in which the signals that are intended for a second telecommunications terminal pass through a first terminal while they are being transmitted.

An illustrative embodiment of the present invention comprises: transmitting a signal from a data-processing system to a second telecommunications terminal; wherein the signal represents a second mode of communication; and wherein the second telecommunications terminal and the second mode of communication are based on: (i) a first telecommunications terminal, and (ii) a mode of communication of a call in progress that involves the first telecommunications terminal; and wherein the transmission of the signal occurs during the call.

DETAILED DESCRIPTION

The terms appearing below are given the following definitions for use in this Description and the appended Claims.

For the purposes of the specification and claims, the term "call" is defined as an interactive communication involving simultaneously present, telecommunications terminal users. A call might be a voice telephone call, an instant messaging (IM) session, a video conference, etc.

For the purposes of the specification and claims, a signal that is "non-disruptive" to a telecommunications user engaged in a call is defined as a signal that the user is able to perceive and comprehend while simultaneously engaging in the exchange of information.

For the purposes of the specification and claims, the term "calendrical time" is defined as indicative of one or more of the following:

(i) a time (e.g., 16:23:58, etc.), (ii) one or more temporal designations (e.g., Tuesday, November, etc.), (iii) one or more events (e.g., Thanksgiving, John's birthday, etc.), and (iv) a time span (e.g., 8:00 pm to 9:00 pm, etc.).

This specification describes two illustrative embodiments of the present invention. The first illustrative embodiment, depicted in FIG. 2 and other related figures, represents a telecommunications system in which the signals that are intended for a second telecommunications terminal bypass a first terminal while they are being transmitted. The second illustrative embodiment, depicted in FIG. 5 and other related figures, represents a telecommunications system in which the signals that are intended for a second telecommunications terminal pass through a first terminal while they are being transmitted.

Figure 1:
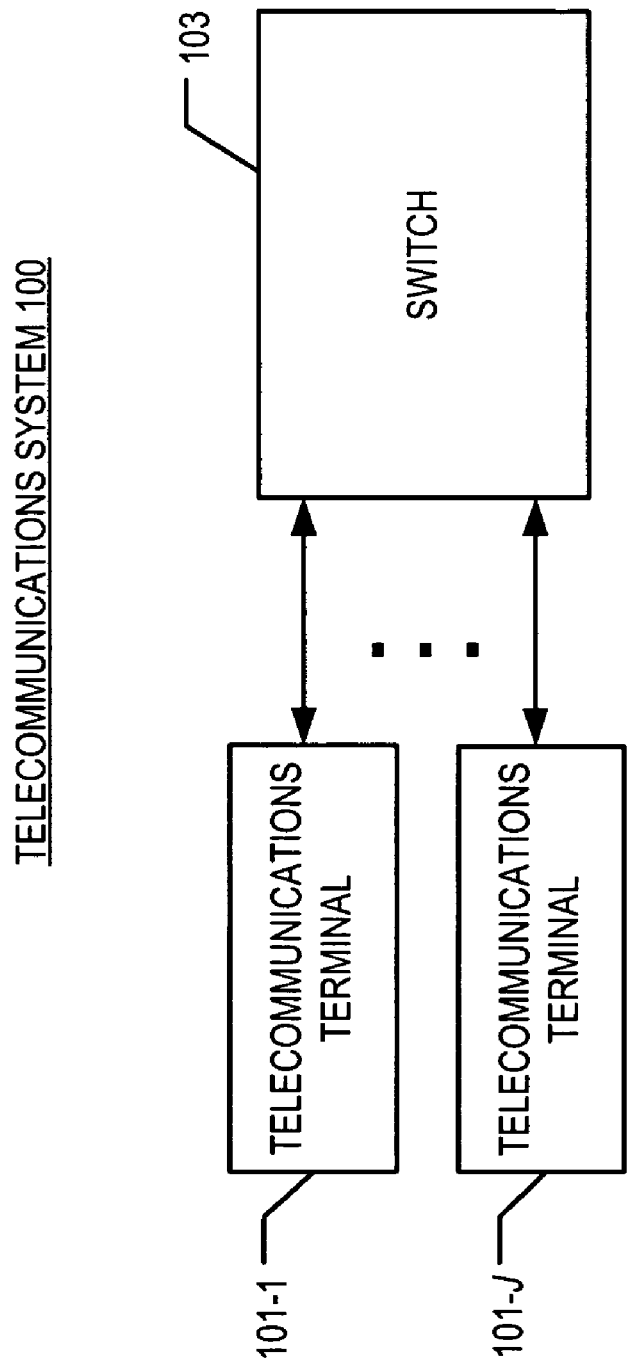
FIG. 1 depicts telecommunications system 100 in the prior art.
Figure 2:
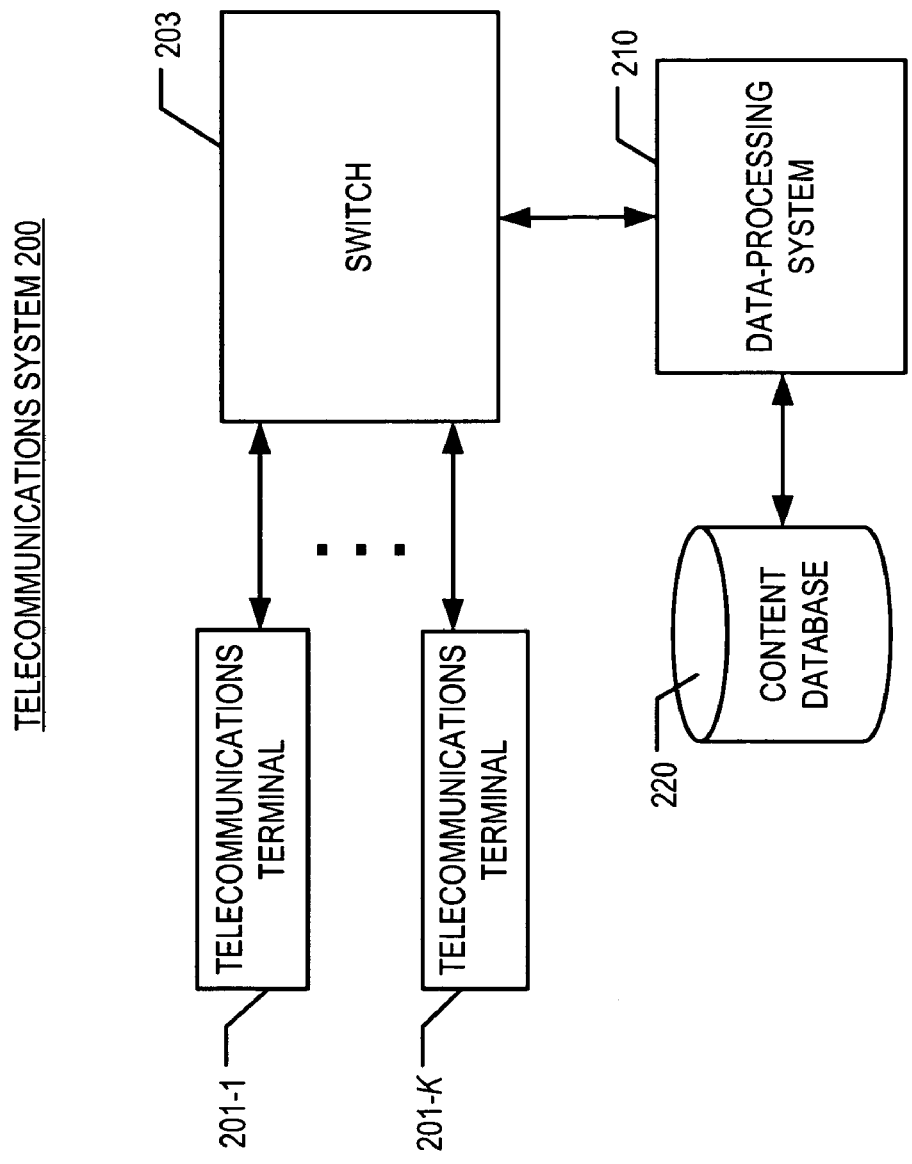
FIG. 2 depicts telecommunications system 200 in accordance with the first illustrative embodiment of the present invention.

FIG. 2 depicts telecommunications system 200 in accordance with the first illustrative embodiment of the present invention. Telecommunications system 200 comprises telecommunications terminals 201-1 through 201-K, wherein K is a positive integer; switch 203; data-processing system 210; and content database 220, interconnected as shown.

Telecommunications terminals 201-k, for k=1 through K, communicate with each other via switch 203 in well-known fashion. Each telecommunications terminal 201-k is capable of placing calls to and receiving calls from one or more other terminals 201. In addition, each telecommunications terminal 201-k is capable of communicating via one or more modes of communication (e.g., voice, video, text messaging, etc.), either one-at-a-time (e.g., voice on one terminal, video on another terminal, etc.) or simultaneously (e.g., voice and video from the same source simultaneously, voice from a first source and video from a second source simultaneously, etc.).

In accordance with the illustrative embodiments, telecommunications terminals 201 are physically separate equipment. For example, terminal 201-1 might be a landline phone, while terminal 201-2 is a television, and so on. In some alternative embodiments, some of telecommunications terminals 201 might represent separate software applications, where two or more of these "software application terminals" execute on a common, computing platform. For example, terminal 201-3 might be a first software application, such as a softphone as is known in the art, and terminal 201-4 might be a second software application, such as RealPlayer®, where both software applications run on the same computer and use at least some of the same hardware.

It will be clear to those skilled in the art how to make and use terminal 201-k.

Switch 203 enables terminals 201-k, for k=1 through K, to communicate with each other by connecting (e.g., electrically, optically, etc.) a terminal to another terminal and by passing signals between the terminals in well-known fashion. Switch 203 is also capable of receiving signals from and transmitting signals to data-processing system 210, in well-known fashion. It will be clear to those skilled in the art how to make and use switch 203.

As will be appreciated by those skilled in the art, in some embodiments two or more telecommunications terminals 201 might be connected via a plurality of switches or other networking equipment (e.g., routers, etc.). It will be clear to those skilled in the art how to make and use telecommunications system 200 with additional networking equipment present.

Data-processing system 210 monitors the telecommunications terminals and users present in telecommunications system 200, monitors various characteristics of the call (e.g., dialog, etc.) that are provided by switch 203, retrieves content from content database 220, selects a terminal to which to deliver content, and transmits the content to switch 203 for delivery to the selected terminal, as described in detail later and with respect to FIGS. 3 and 4.

Content database 220 stores a plurality of multimedia content (e.g., scripted video, instruction manuals, audio announcements, etc.) and enables efficient retrieval of content based on call-related properties such as topic and mode of communication. Content database 220 receives queries from data-processing system 210 and returns content to data-processing system 210 in well-known fashion. It will be clear to those skilled in the art how to build and use content database 220.

Figure 3:
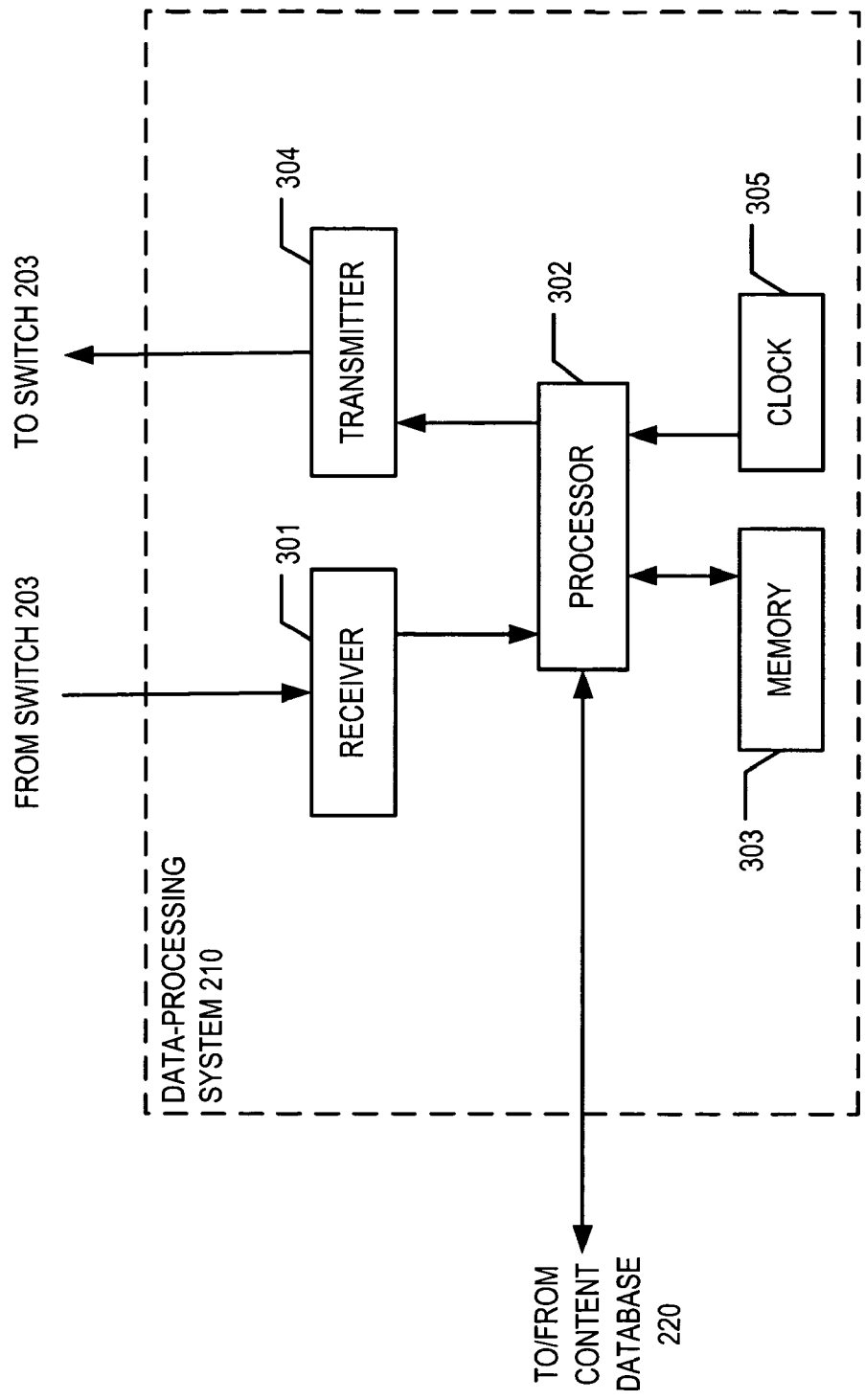
FIG. 3 depicts a block diagram of data-processing system 210, as shown in FIG. 2, in accordance with the illustrative embodiments of the present invention.

FIG. 3 depicts a block diagram of the salient components of data-processing system 210, in accordance with the illustrative embodiment of the present invention. As shown in FIG. 3, data-processing system 210 comprises receiver 301, processor 302, memory 303, transmitter 304, and clock 305, interconnected as shown.

Receiver 301 receives from switch 203:

(i) signals that indicate the state of a call (e.g., commencement of a call, termination of a call, transferring of a call, on-hold, etc.);

(ii) signals that convey information about the users and telecommunications terminals involved in a call (e.g., calendrical times, geo-locations of terminals, etc.); and (iii) signals that represent dialog of a call;

and forwards the information encoded in the signals to processor 302, in well-known fashion.

Receiver 301 receives geo-location information, as is known in the art, about the terminals through switch 203. In some alternative embodiments, however, receiver 301 might receive information that associates one terminal with another. For example, data-processing system 210 serving a hotel might be initialized with information that associates, for each guest room, the phone extension in the room with the local area network address of the television set-top box in that room.

It will be clear to those skilled in the art, after reading this specification, how to make and use receiver 301.

Processor 302 is a general-purpose processor that is capable of receiving information from receiver 301, of executing instructions stored in memory 303, of reading data from and writing data into memory 303, of executing the tasks described below and with respect to FIG. 4, and of transmitting information to transmitter 304. In some alternative embodiments of the present invention, processor 302 might be a special-purpose processor. In either case, it will be clear to those skilled in the art, after reading this specification, how to make and use processor 302.

Memory 303 stores data and executable instructions, as is well-known in the art, and might be any combination of random-access memory (RAM), flash memory, disk drive memory, etc. It will be clear to those skilled in the art, after reading this specification, how to make and use memory 303.

Transmitter 304 receives information from processor 302 and transmits signals that encode this information to terminal 201-$k$, in well-known fashion, via switch 203. It will be clear to those skilled in the art, after reading this specification, how to make and use transmitter 304.

Clock 305 transmits the current time, date, and day of the week to processor 302 in well-known fashion.

Figure 4:
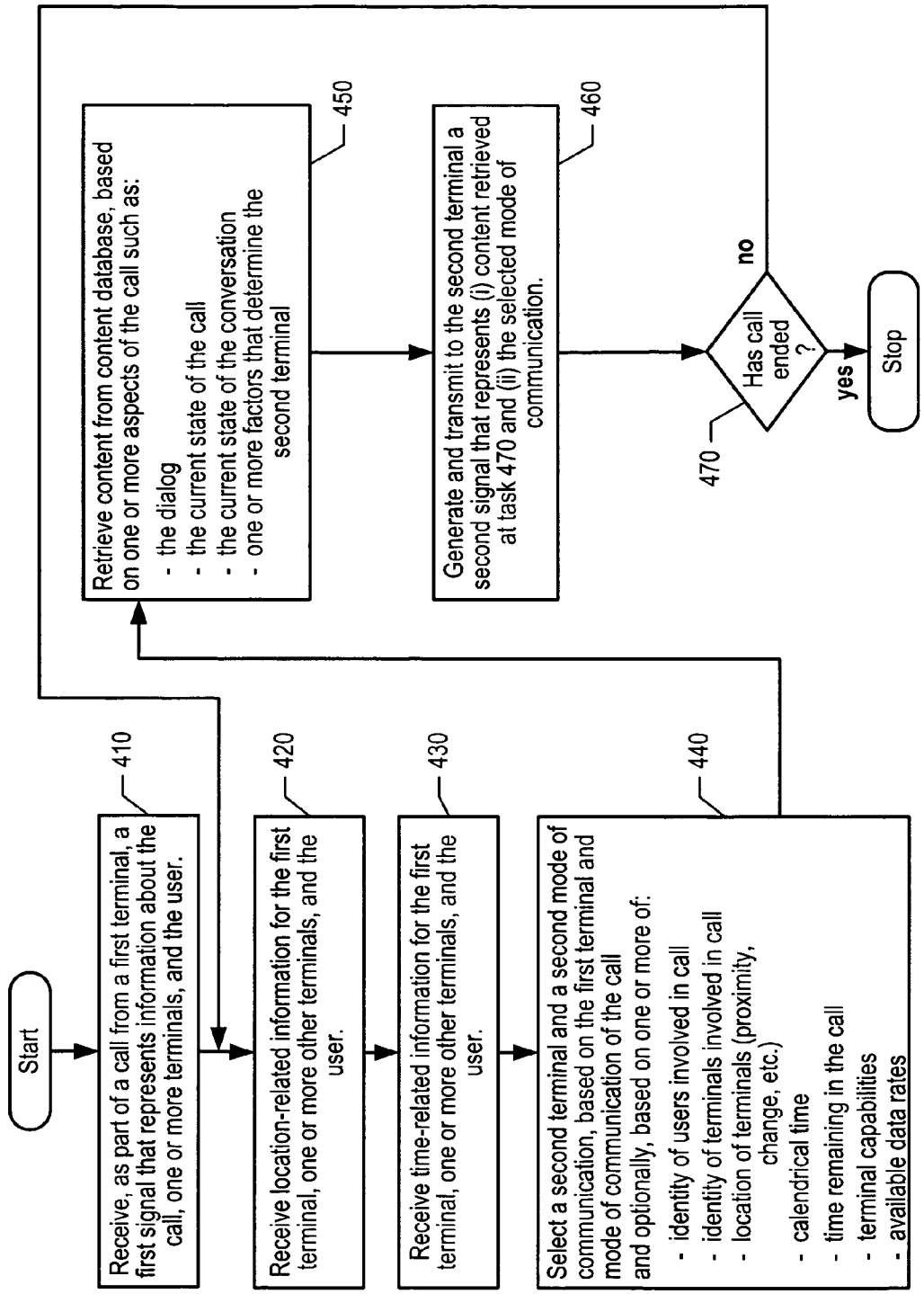
FIG. 4 depicts a flowchart of the salient tasks of data-processing server 210, in accordance with the illustrative embodiments of the present invention.

FIG. 4 depicts a flowchart of the salient tasks of data-processing system 210, in accordance with the illustrative embodiments of the present invention. It will be clear to those skilled in the art which tasks depicted in FIG. 4 can be performed simultaneously or in a different order than that depicted.

At task 410, data-processing system 210 receives (i) an indication of the commencement of a call from switch 203, and (ii) information about the users and telecommunications terminals involved in the call, in well-known fashion. The received information comprises one or more of the following: the identities of the users; phone numbers, Internet Protocol addresses, or other terminal identifiers; modes of communication supported by the terminal; etc.

At task 420, data-processing system 210 receives information related to the locations of (i) the telecommunications terminals involved in the call, and (ii) other telecommunications terminals that are a part of telecommunications system 200. In accordance with the illustrative embodiments, data-processing system 210 receives this information from the telecommunications terminals. In some alternative embodiments, data-processing system 210 receives geo-location information from position-determining equipment, as is known in the art. In some other alternative embodiments, data-processing system 210 receives, at time of initialization, information that establishes the relative positions or relationships between the terminals. It will be clear to those skilled in the art how to obtain location-related information about the terminals present.

At task 430, data-processing system 210 receives and maintains time-related information. The time-related information comprises: (i) the local times at the telecommunications terminals involved in the call, and (ii) an estimate of the time that is remaining in the call (or the time required to conduct the call). The estimate of the time remaining in the call is calculated in well-known fashion—for example, by determining the nature of the call and then referring to a call log of similar calls to obtain the average call duration.

At task 440, data-processing system 210 selects (i) terminal 201-$k$ that is not part of the call and (ii) a mode of communication. Data-processing system 210 selects the terminal and mode of communication for the purpose of transmitting content to a user on a call, where the content is related to the call. The selected terminal and mode of communication are based on the user's terminal involved in the call and on the mode of communication of the call. In some embodiments, the mode of communication of the selected terminal (or "second terminal") is different than the mode of communication of the terminal involved in the call (or "first terminal"), so as not to be disruptive to the call.

In some embodiments, data-processing system 210 might also base the selection of a telecommunications terminal and mode of communication on at least one of:

i. the identity of one or more users involved in the call;
ii. the identifier (e.g., phone number, Internet Protocol address, etc.) of one or more telecommunications terminals involved in the call;
iii. the geo-location of one or more terminals;
iv. a change in the geo-location of a terminal;
v. the proximity of one terminal with respect to another;
vi. the calendrical time at one or more terminals;
vii. the time remaining in the call;
viii. the capabilities (e.g., screen size, data rate, etc.) of an available terminal or of the terminal being used by the user;
ix. the data rate available for transmitting content to a terminal; and
x. one or more characteristics of the call.

At task 450, data-processing system 210 retrieves from content database 220 content that (i) is consistent with the mode of communication selected at task 440, and (ii) is based on one or more characteristics of the call, in well-known fashion (e.g., via a query, etc.). A technique for selecting content based on the call—based on the dialog of the call, in particular—can be found in U.S. application Ser. No. 10/950, 984, which is incorporated by reference.

In some embodiments, data-processing system 210 might also base the selection of content on at least one of:

i. the current state of the call (e.g., on-hold, transferring to another line, engaged in conversation, etc.);
ii. the current state of the conversation (e.g., greeting, main conversation, data entry [such as keying in a personal identification number], adjournment, etc.);
iii. the identity of one or more users involved in the call;

iv. one or more telecommunications terminals involved in the call (e.g., phone number, Internet Protocol address, type of terminal, etc.);

v. the locations of one or more of the terminals involved in the call; and vi. the calendrical time at one or more of the terminals involved in the call.

At task 460, data-processing system 210 generates signals that represent the content retrieved at task 450 and transmits the signals to the selected second terminal, in well-known fashion.

At task 470, data-processing system 210 checks whether the call has ended. If the call has ended, the method of FIG. 4 terminates; otherwise, execution goes back to task 420 to deliver content potentially to a different telecommunications terminal than the one previously selected.

As will be appreciated by those skilled in the art, in some embodiments of the present invention one or more tasks of FIG. 4 might be optional. For example, in some alternative embodiments task 420 or 430 or both might not be performed, in which case the telecommunications terminal selected to accept content delivery might be based solely on one or more of: (i) the identity of one or more users involved in the call and (ii) the identity of one or more terminals involved in the call. It will be clear to those skilled in the art how to make and use such embodiments of the present invention.

Figure 5:
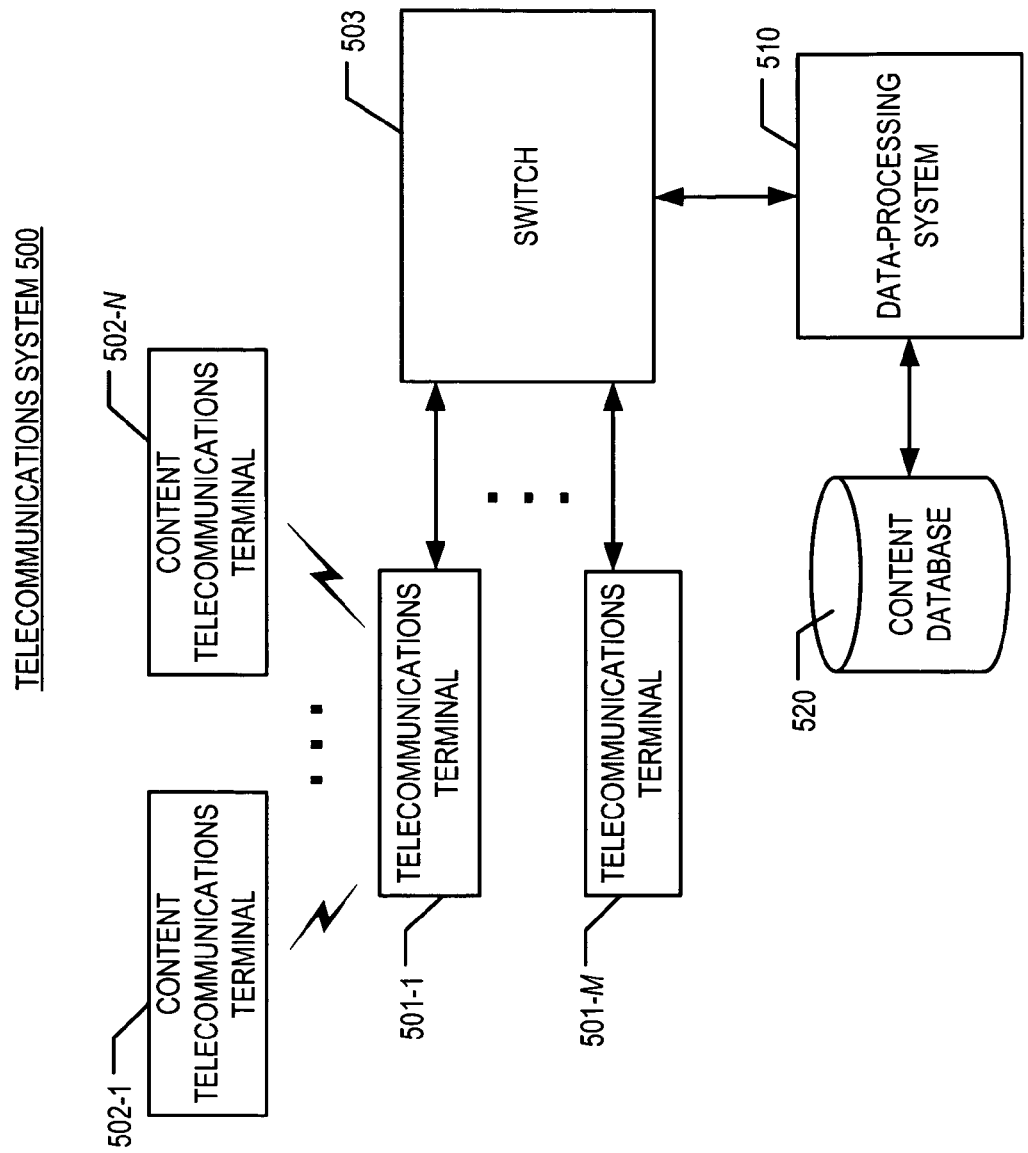
FIG. 5 depicts telecommunications system 500 in accordance with the second illustrative embodiment of the present invention.

FIG. 5 depicts telecommunications system 500 in accordance with the second illustrative embodiment of the present invention. Telecommunications system 500 comprises telecommunications terminal 501-1 through 501-M, wherein M is a positive integer; content telecommunications terminals 502-1 through 502-N, wherein N is a positive integer; switch 503; data-processing system 510; and content database 520, interconnected as shown.

Telecommunications terminals 501-$m$, for m=1 through M, communicate with each other via switch 503 in well-known fashion. Each telecommunications terminal 501-$m$ is capable of placing calls to and receiving calls from one or more other terminals 501. In addition, each telecommunications terminal 501-$m$ is capable of communicating via one or more modes of communication (e.g., voice, video, text messaging, etc.), either one-at-a-time (e.g., voice on one terminal, video on another terminal, etc.) or simultaneously (e.g., voice and video from the same source simultaneously, voice from a first source and video from a second source simultaneously, etc.).

At least one of telecommunications terminals 501-1 through 501-M is also capable of communicating with one or more content telecommunications terminals 502 in well-known fashion. Terminal 501-1 is an example of such a terminal, as depicted in FIG. 5. In accordance with the second illustrative embodiment of the present invention, terminal 501-1 communicates wirelessly (e.g., via Bluetooth, via IEEE 802.11, etc.) with a selected content terminal 502-$n$. In some alternative embodiments, terminal 501-$m$ might communicate via other means (e.g., wired local area network, etc.) with content terminal 502-$n$.

It will be clear to those skilled in the art, after reading this specification, how to make and use terminal 501-$m$.

Content telecommunications terminals 502-$n$, for n=1 through N, communicate with telecommunications terminal 501-$m$ (e.g., terminal 501-1, etc.) in well-known fashion. Each content telecommunications terminal 502-$n$ is capable of communicating via one or more modes of communication (e.g., voice, video, text messaging, etc.), either one-at-a-time (e.g., voice only, video only, etc.) or simultaneously (e.g., voice and video from the same source simultaneously, voice from a first source and video from a second source simultaneously, etc.). It will be clear to those skilled in the art how to make and use content terminal 502-$n$.

In accordance with the second illustrative embodiment, telecommunications terminals 501-$m$ and 502-$n$ are physically separate equipment. For example, terminal 501-1 might be a cell phone, while terminal 502-1 is a personal digital assistant, and so on. In some alternative embodiments, terminal 501-$m$ and one or more terminals 502 might represent separate software applications that execute on a common, computing platform. For example, terminal 501-3 might be a first software application, such as a softphone as is known in the art, and terminal 502-4 might be a second software application, such as RealPlayer®, where both software applications run on the same computer and use at least some of the same hardware.

Switch 503 enables terminals 501-$m$, for m=1 through M, to communicate with each other by connecting (e.g., electrically, optically, etc.) a terminal to another terminal and by passing signals between the terminals in well-known fashion. Switch 503 is also capable of receiving signals from and transmitting signals to data-processing system 510, in well-known fashion. It will be clear to those skilled in the art how to make and use switch 503.

As will be appreciated by those skilled in the art, in some embodiments two or more telecommunications terminals 501 might be connected via a plurality of switches or other networking equipment (e.g., routers, etc.). It will be clear to those skilled in the art how to make and use telecommunications system 500 with additional networking equipment present.

Data-processing system 510 is similar to data-processing system 210, in that it monitors the telecommunications terminals and users present in telecommunications system 500, monitors various characteristics of the call (e.g., dialog, etc.) that are provided by switch 503, retrieves content for an intended user from content database 520 based on a selected mode of communication, and transmits the content to switch 503 for delivery to the intended user, as described in detail earlier and with respect to FIGS. 3 and 4.

Data-processing system 510, in accordance with the second illustrative embodiment of the present invention, differs from data-processing system 210, in that the specific terminal that will accept the transmitted content (i.e., content terminal 502-$n$) is not selected by data-processing system 510 alone. Instead, data-processing system 510 transmits the content to the intended user through the user's terminal 501-$m$. Terminal 501-$m$ then delivers the content to content terminal 502-$n$, which terminal 501-$m$ selects, at least in part.

It will be clear to those skilled in the art, after reading this specification, how to make and use data-processing system 510.

Content database 520 stores a plurality of multimedia content (e.g., video advertisements, instruction manuals, audio announcements, etc.) and enables efficient retrieval of content based on call-related properties such as topic and mode of communication. Content database 520 receives queries from data-processing system 510 and returns content to data-processing system 510 in well-known fashion.

Content database 520 is equivalent to content database 220, in that it stores a plurality of multimedia content (e.g., scripted video, instruction manuals, audio announcements, etc.) and enables efficient retrieval of content based on call-related properties. Content database 520 receives queries from data-processing system 510 and returns content to data-processing system 510 in well-known fashion. It will be clear to those skilled in the art how to build and use content database 520.

Figure 6:
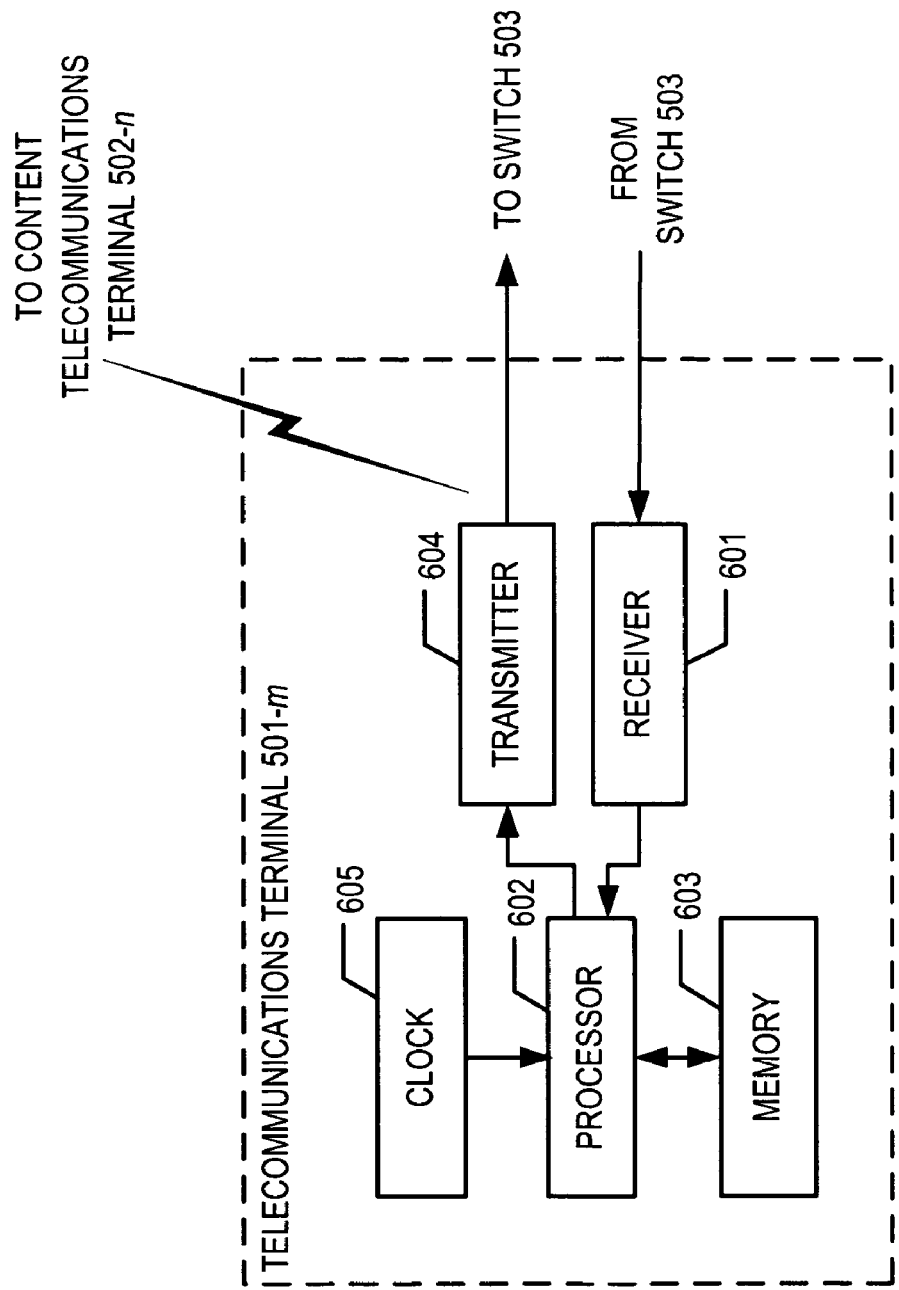
FIG. 6 depicts a block diagram of terminal 501, as shown in FIG. 5, in accordance with the second illustrative embodiment of the present invention.

FIG. 6 depicts a block diagram of the salient components of telecommunications terminal 501-*m*, in accordance with the illustrative embodiment of the present invention. As shown in FIG. 6, telecommunications terminal 501-*m* comprises receiver 601, processor 602, memory 603, transmitter 604, and clock 605, interconnected as shown.

Receiver 601 is capable of receiving signals transmitted by switch 503 and of forwarding the information encoded in these signals to processor 602, in well-known fashion. It will be clear to those skilled in the art, after reading this disclosure, how to make and use receiver 601.

Processor 602 is a general-purpose processor that is capable of receiving information from receiver 601, of executing instructions stored in memory 603, of reading data from and writing data into memory 603, of executing the tasks described below and with respect to FIG. 7, and of transmitting information to transmitter 604. In some alternative embodiments of the present invention, processor 602 might be a special-purpose processor. In either case, it will be clear to those skilled in the art, after reading this specification, how to make and use processor 602.

Memory 603 stores data and executable instructions, as is well-known in the art, and might be any combination of random-access memory (RAM), flash memory, disk drive memory, etc. It will be clear to those skilled in the art, after reading this specification, how to make and use memory 603.

Transmitter 604 receives information from processor 602 and transmits signals that encode this information to content terminal 502-*n* or switch 503, in well-known fashion. It will be clear to those skilled in the art, after reading this specification, how to make and use transmitter 604.

Clock 605 transmits the current time, date, and day of the week to processor 602 in well-known fashion.

Figure 7:
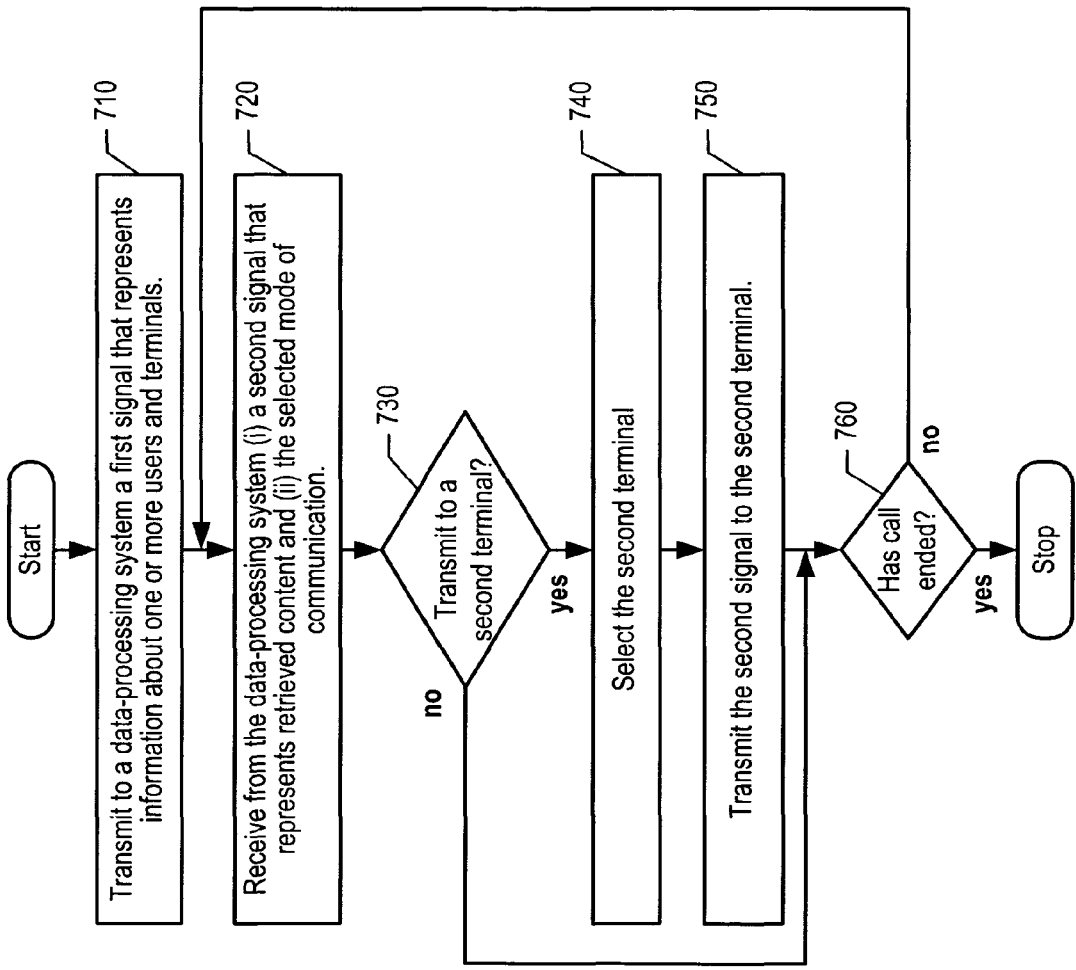
FIG. 7 depicts a flowchart of the salient tasks of terminal 501, in accordance with the second illustrative embodiment of the present invention.

FIG. 7 depicts a flowchart of the salient tasks of telecommunications terminal 501-*m*, in accordance with the illustrative embodiments of the present invention. It will be clear to those skilled in the art which tasks depicted in FIG. 7 can be performed simultaneously or in a different order than that depicted.

At task 710, telecommunications terminal 501-*m* (i.e., the first telecommunications terminal) transmits (i) an indication of the commencement of a call to data-processing system 510 via switch 503, and (ii) information about the user and telecommunications terminal 501-*m* involved in the call (e.g., identities of the user; phone number, Internet Protocol address, or other terminal identifier; modes of communication supported by the terminal; etc.), in well-known fashion.

At task 720, telecommunications terminal 501-*m* receives the content retrieved by data-processing system 510, in well-known fashion.

At task 730, telecommunications terminal 501-*m* determines in well-known fashion whether to transmit the content to a second telecommunications terminal (e.g., content telecommunications terminal 502-1, etc.). For example, data-processing system 510 might have marked the content as having to be delivered to a second terminal. If the content is not to be forwarded, execution proceeds to task 760; otherwise, execution proceeds to task 740.

At task 740, telecommunications terminal 501-*m* selects content terminal 502-*n* as the second terminal. Telecommunications terminal 501-*m* selects the terminal for the purpose of transmitting, to an intended user, content that is related to the call. The selection is based on (i) terminal 501-*m* itself as the intended user's terminal involved in the call and (ii) the mode of communication associated with the content. In some embodiments, the mode of communication of selected content terminal 502-*n* is different than the mode of communication of terminal 501-*m* involved in the call, so as not to be disruptive to the call.

In some embodiments, telecommunications terminal 501-*m* might also base the selection of the second telecommunications terminal on at least one of:
 i. the identity of one or more users involved in the call;
 ii. the identifier (e.g., phone number, Internet Protocol address, etc.) of one or more telecommunications terminals involved in the call;
 iii. the geo-location of one or more terminals;
 iv. a change in the geo-location of a terminal;
 v. the proximity of one terminal with respect to another;
 vi. the calendrical time at one or more terminals;
 vii. the time remaining in the call;
 viii. the capabilities (e.g., screen size, data rate, etc.) of an available terminal or of the terminal being used by the user;
 ix. the data rate available for transmitting content to a terminal; and
 x. one or more characteristics of the call.

As will be appreciated by those who are skilled in the art, some of the items listed above are directly available to telecommunications terminal 501-*m* (e.g., its calendrical time, etc.), while some items can be provided by data-processing system 510 (e.g., proximity to other terminals, etc.).

At task 750, telecommunications terminal 501-*m* transmits the content received at task 720 to selected content terminal 502-*n*, in well-known fashion.

At task 760, telecommunications terminal 501-*m* checks whether the call has ended. If the call has ended, the method of FIG. 7 terminates; otherwise, execution goes back to task 720 to deliver content potentially to a different telecommunications terminal than the one previously selected.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
identifying, during a call that involves a first mode of electronic communication and a first telecommunications terminal, a second telecommunications terminal that is external to the call and configured to process a second mode of electronic communication; and
transmitting, from a data processing system to the second telecommunications terminal, during the call and using the second mode of electronic communication, electronic media that includes content that is related to the call and that is formatted according to a predefined electronic media format;
wherein identifying the second telecommunications terminal is based at least in part upon
an ability of the second telecommunications terminal to present the electronic media,
the second mode of electronic communication, and
a geolocation of the first telecommunications terminal.

2. The method of claim 1, wherein the first mode of electronic communication is a mode of electronic communication selected from the group consisting of a voice telephone call, an instant message, a text message, and a video call.

3. The method of claim 2, wherein the second mode of electronic communication is a mode of electronic communication selected from the group consisting of a voice telephone call, an instant message, a text message, and a video call.

4. The method of claim 3, wherein the first mode of electronic communication is different from the second mode of electronic communication.

5. The method of claim 1, wherein
identifying the second telecommunications terminal is further based at least in part upon at least one factor selected from a group of factors consisting of:
estimated time remaining in the call; and
calendrical time at the first telecommunications terminal.

6. The method of claim 5, wherein the first mode of electronic communication is a mode of electronic communication selected from the group consisting of a voice telephone call, an instant message, a text message, and a video call.

7. The method of claim 6, wherein the second mode of electronic communication is a mode of electronic communication selected from the group consisting of a voice telephone call, an instant message, a text message, and a video call.

8. The method of claim 7, wherein the first mode of electronic communication is different from the second mode of electronic communication.

9. The method of claim 1, wherein transmitting from a data processing system to the second telecommunications terminal includes bypassing the first telecommunications terminal.

10. The method of claim 1, wherein identifying the second telecommunications terminal is based at least in part upon available data rate.

11. The method of claim 1, wherein identifying the second telecommunications terminal is based at least in part upon an identifier of the first telecommunications terminal.

12. A method comprising:
identifying, during a call that involves a first mode of electronic communication and a first telecommunications terminal, a second telecommunications terminal that is external to the call and configured to process a second mode of electronic communication; and
transmitting, from a data processing system to the second telecommunications terminal, during the call and using the second mode of electronic communication, electronic media that includes content that is related to the call and that is formatted according to a predefined electronic media format;
wherein identifying the second telecommunications terminal is based at least in part upon
an ability of the second telecommunications terminal to present the electronic media,
the second mode of electronic communication, and
a change in geolocation of the first telecommunications terminal.

13. The method of claim 12, wherein the first mode of electronic communication is a mode of electronic communication selected from the group consisting of a voice telephone call, an instant message, a text message, and a video call.

14. The method of claim 13, wherein the second mode of electronic communication is a mode of electronic communication selected from the group consisting of a voice telephone call, an instant message, a text message, and a video call.

15. The method of claim 14, wherein the first mode of electronic communication is different from the second mode of electronic communication.

16. The method of claim 12, wherein
identifying the second telecommunications terminal is further based at least in part upon at least one factor selected from a group of factors consisting of:
estimated time remaining in the call; and
calendrical time at the first telecommunications terminal.

17. The method of claim 16, wherein the first mode of electronic communication is a mode of electronic communication selected from the group consisting of a voice telephone call, an instant message, a text message, and a video call.

18. The method of claim 17, wherein the second mode of electronic communication is a mode of electronic communication selected from the group consisting of a voice telephone call, an instant message, a text message, and a video call.

19. The method of claim 18, wherein the first mode of electronic communication is different from the second mode of electronic communication.

20. The method of claim 12, wherein transmitting from a data processing system to the second telecommunications terminal includes bypassing the first telecommunications terminal.

21. The method of claim 12, wherein identifying the second telecommunications terminal is based at least in part upon available data rate.

22. The method of claim 12, wherein identifying the second telecommunications terminal is based at least in part upon an identifier of the first telecommunications terminal.

23. A method comprising:
identifying, during a call that involves a first mode of electronic communication and a first telecommunications terminal, a second telecommunications terminal that is external to the call and configured to process a second mode of electronic communication; and
transmitting, from a data processing system to the second telecommunications terminal, during the call and using the second mode of electronic communication, electronic media that includes content that is related to the call and that is formatted according to a predefined electronic media format;
wherein identifying the second telecommunications terminal is based at least in part upon
an ability of the second telecommunications terminal to present the electronic media,
the second mode of electronic communication, and
proximity of the first telecommunications terminal and the second telecommunications terminal.

24. The method of claim 23, wherein the first mode of electronic communication is a mode of electronic communication selected from the group consisting of a voice telephone call, an instant message, a text message, and a video call.

25. The method of claim 24, wherein the second mode of electronic communication is a mode of electronic communication selected from the group consisting of a voice telephone call, an instant message, a text message, and a video call.

26. The method of claim 25, wherein the first mode of electronic communication is different from the second mode of electronic communication.

27. The method of claim 23, wherein
identifying the second telecommunications terminal is further based at least in part upon at least one factor selected from a group of factors consisting of:
estimated time remaining in the call; and
calendrical time at the first telecommunications terminal.

28. The method of claim 27, wherein the first mode of electronic communication is a mode of electronic communication selected from the group consisting of a voice telephone call, an instant message, a text message, and a video call.

29. The method of claim 28, wherein the second mode of electronic communication is a mode of electronic communication selected from the group consisting of a voice telephone call, an instant message, a text message, and a video call.

30. The method of claim 29, wherein the first mode of electronic communication is different from the second mode of electronic communication.

31. The method of claim 23, wherein transmitting from a data processing system to the second telecommunications terminal includes bypassing the first telecommunications terminal.

32. The method of claim 23, wherein identifying the second telecommunications terminal is based at least in part upon available data rate.

33. The method of claim 23, wherein identifying the second telecommunications terminal is based at least in part upon an identifier of the first telecommunications terminal.

* * * * *